United States Patent [19]

Parker

[11] 4,319,965
[45] Mar. 16, 1982

[54] BAROMETRIC DISTILLATION SYSTEM

[76] Inventor: Sidney A. Parker, 5820 Diamond Oaks Dr. S., Fort Worth, Tex. 76117

[21] Appl. No.: 188,347

[22] Filed: Sep. 18, 1980

[51] Int. Cl.³ .............................................. B01D 3/10
[52] U.S. Cl. ..................................... 202/205; 203/11; 203/91; 203/99; 203/DIG. 22
[58] Field of Search ....................... 202/205, 172, 173; 203/10, 11, 19, 91, 99, 86, DIG. 13, DIG. 14, DIG. 17, DIG. 22, DIG. 24

[56] References Cited

U.S. PATENT DOCUMENTS 2,490,659  12/1949  Snyder ................................. 202/205
3,558,436  1/1971  Foley et al. ......................... 202/205

Primary Examiner—Frank Sever

[57] ABSTRACT

The invention relates to a system for purifying salty or brackish water which may, also, contain solids and living organisms making the water unpalatable for agriculture or long term animal consumption. The system includes a cyclic mechanism which causes an evaporable liquid to boil at a predetermined pressure and temperature in a first vertical elongated column, vapor cross over means to a second vertical elongated column, said vapor being condensed at a predetermined pressure and temperature in the second vertical elongated column, means for supplying heat to the first column, heat rejection means for the second column for reliquefying the material. Heat may be supplied to the first column by low temperature geothermal heat, heat from solar ponds, heat from solar collecting devices, as well as heat from the ambient air, or any form of low temperature heat for vaporizing the subject liquid. Heat supplied to first vertical column is always kept at a greater temperature than the second column, liquid cyclic means being provided by pump means forcing liquid in both vertical columns to the top of both vertical columns, means for venting noncondensables to the atmosphere, control means for deactivating pump means of first and second columns, gravity causes the liquid to fall in first and second vertical columns causing vaporization of the liquid in the first column and reliquefying in the second column accomplishing single stage distillation. Liquid seal means at the base of the first vertical column, liquid seal means at the base of the second vertical column.

Another aspect of this invention takes advantage of cyclic relatively low pressure to degas the liquid from dangerous and hazardous dissolved gases of chlorine, arsenic, etc found in large quantities in water.

Yet another aspect of the present invention is cellular destruction (DNA) of most living organisms present in the brackish water.

66 Claims, 7 Drawing Figures

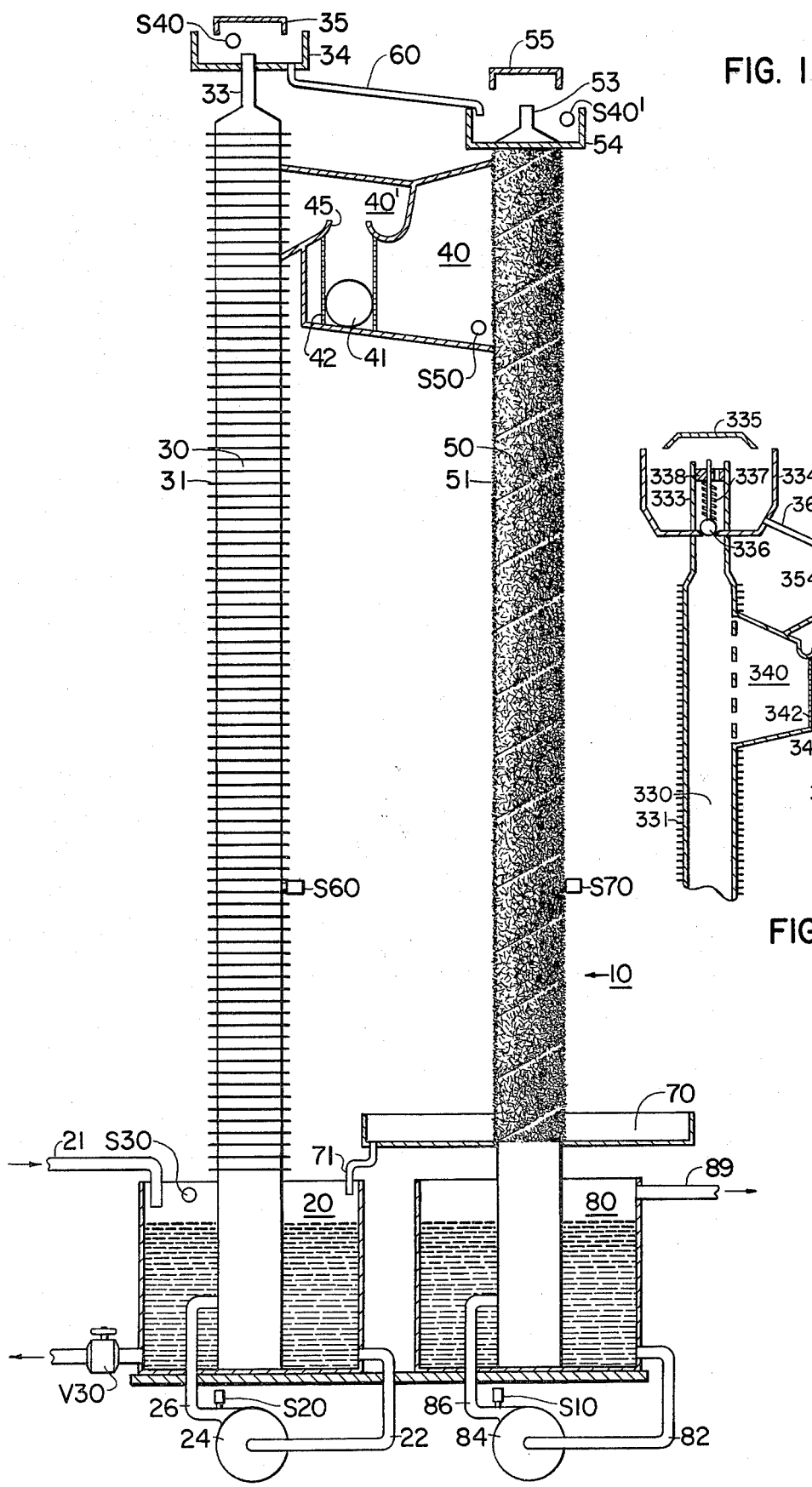
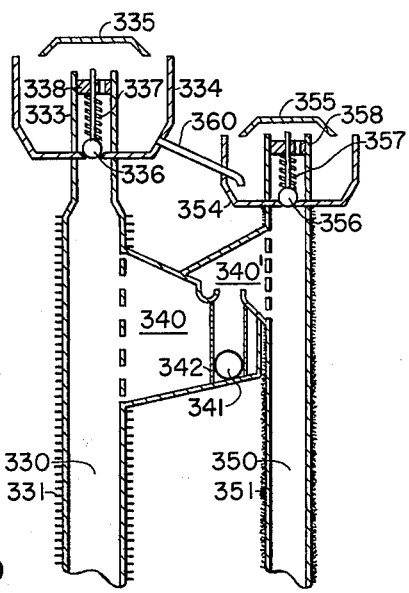
FIG. 1
FIG. 3

TO DISTILLATION TOWER PUMP

TO BRACKISH WATER TOWER PUMP

TO DISTILLATION TOWER WICKING PUMP $S_1$ IS S10, S210, S410
$S_2$ IS S20, S220, S420
$S_3$ IS S30, S230, S430
$S_4$ IS S40, S40¹, S240¹
$S_5$ IS S50, S250, S450, S550
$S_6$ IS S60, S260, S460
$S_7$ IS S70, S270, S470

BAROMETRIC DISTILLATION SYSTEM

BACKGROUND AND SUMMARY OF THE INVENTION

This invention relates to a system for purifying a liquid (water) utilizing low grade heat, heat at or near the temperature range in which man and other life forms live.

The Department of Energy in the United States and similar governmental departments in other nations throughout the world have since their creation dedicated their scientific genius to finding new ways to provide energy from new energy sources not commonly used for the past ten to fifteen decades. The recent world-wide oil crisis brought into focus the increasing demand for energy in this country and elsewhere. In considering the demand for increased quantities of water for our cities and agriculture needs, it occurred to me that better lower level energy means might be employed to convert normally unusable salty or brackish water to pure water for use in areas of the world that presently have copious amounts of unusable water, examples of lands that have in or adjacent to them large quantities of brackish water include: Saudi Arabia, southern and western parts of Iran, North Africa, Southwest Africa, West and Southwest Australia, west side of Mexico (such as the Peninsula of Mexico, Baja), the Sonora Gran Desert and many hundreds of the Pacific and Atlantic Ocean Islands and the southwest and western states of the United States. A new type of water purification apparatus can overcome these deficiencies and provide ample amounts of fresh water. The water purification apparatus of this invention is best suited for dry, warm to hot arid areas where little or no fresh water is available, yet there are large amounts of brackish or contaminated water nearby.

An object of the present invention is to provide a novel means for purifying large quantities of brackish or contaminated water into fresh (pure) water at very low external energy input of the conventional type by using the warm to hot (65° F. to 150° F.) arid conditions available to power the water purification apparatus. The water quality is potable and should at least equal the best of water systems now used in the United States of America.

Another object of the present invention is to provide an improved system for producing single or multistage distilled liquid by using the weight of the liquid in a gravitational field to perform distillation by forming a vacuum of such an extent that, at a reduced pressure, the vapor pressure of the liquid, in one application, water, will boil at a substantially lower temperature. Liquid (water) is pumped to a height exceeding its ability to maintain liquid form when in the earth's gravitational field when the column or columns are closed at the top and all noncondensables are vented at the top of the column or columns and then the liquid is allowed to drop in the column or columns due to the gravitational forces exerted on the water (liquid) molecules. According to the laws of nature as defined by the laws of thermodynamics one can now design a water purification plant for vaporizing a liquid using the heat from the ambient air, solar radiation, low temperature geothermal heat or any other low grade heat (low temperature heat) and using blackbody radiation or using the wet bulb temperature or both blackbody and wet bulb temperature in these dry arid areas of the world to provide a predetermined ΔT to perform distillation.

The distillation system of the present invention requires a minimum of two substantially vertical columns (vessels) which exceed the height which a liquid (water) can maintain itself as a liquid at a given pressure and temperature. A second vertical column (vessel) will be used to condense the vapor being formed from the first vertical vessel or vertical column.

The second embodiment of the invention is for a minimum of two vertical columns of water, one brackish and the other single stage distilled liquid, to cycle from their lower reservoirs (forming liquid seals) to the top of their respective columns at a predetermined rate in one configuration. Liquid (distilled water) is pumped from a lower level to the top of a second column where all noncondensables are vented to the atmosphere, then pump means for the brackish water is activated and the brackish water is pumped from a lower level to the top of the first column where all remaining noncondensables from the first column, as well as the vapor crossover means are vented to the atmosphere. Vapor crossover means has a selectively isolation means between the first vertical elongated column and the second vertical elongated column. Said vapor-liquid isolation means prevents cross contamination between the second vertical column of distilled water and first vertical elongated column of brackish water when cycling and recharging the distillation plant. The first and second vertical elongated columns have liquid seal means at the base of each column which also act as liquid reservoirs.

A third embodiment of the invention, the distillation plant has a self cleaning internal device to maintain good heat transfer and kept relatively free of deposits in the first column which performs the conversion of liquid to vapor of the media (water) for distillation.

A fourth embodiment of the invention, is back flushing of the feedstock in the first vertical column which is now essentially free of most water born living organisms due to the rapid change from a higher absolute pressure to a lower absolute pressure caused during back flushing of first vertical column, charging of first vertical column and rapidly going to subbaric pressure developed during evaporation which substantially explodes or ruptures the living organism's cellular structures, thus killing them without the aid of materials normally called insecticides or poisons. It should be noted that this process does not contaminate the environment.

A fifth embodiment of the invention, is radiating the vapor crossover means or radiating the top portion of the first vertical elongated column or radiating combination the first vertical column and the vapor crossover means by mercury vapour lamps, xenon lamps, hydrogen arc lamps, microwave bombardment, X-ray, Beta rays, Gamma rays, Alpha rays or any combination radiation of sufficient density and exposure time to be totally lethal for complete destruction of any microorganisms passing through this chamber or chambers when such chamber or chambers are in direct communication to the distilled water. It should also be noted that treatment of highly dangerous bacteria contaminated waste water may require radiation of the type described.

A sixth embodiment of this invention encompasses control means of said first vertical elongated column or columns and second vertical elongated column or columns for operatively sequentially controlling said pump means and temperature of said vertical elongated columns.

Other objects and advantages of the present invention will be made more apparent hereinafter.

BRIEF DESCRIPTION OF THE DRAWINGS

There is illustrated in the attached drawing presently preferred embodiments of the present invention, wherein:

FIG. 1 shows one form of the present invention illustrating the essential components thereof and the relationship between the two substantially vertical columns.

FIG. 2 illustrates a modification of the system of FIG. 1; and

FIG. 3 illustrates yet another modification of FIG. 1 and FIG. 2; and

DETAILED DESCRIPTION OF THE PREFERRED EMBODIMENT

Figure 7:
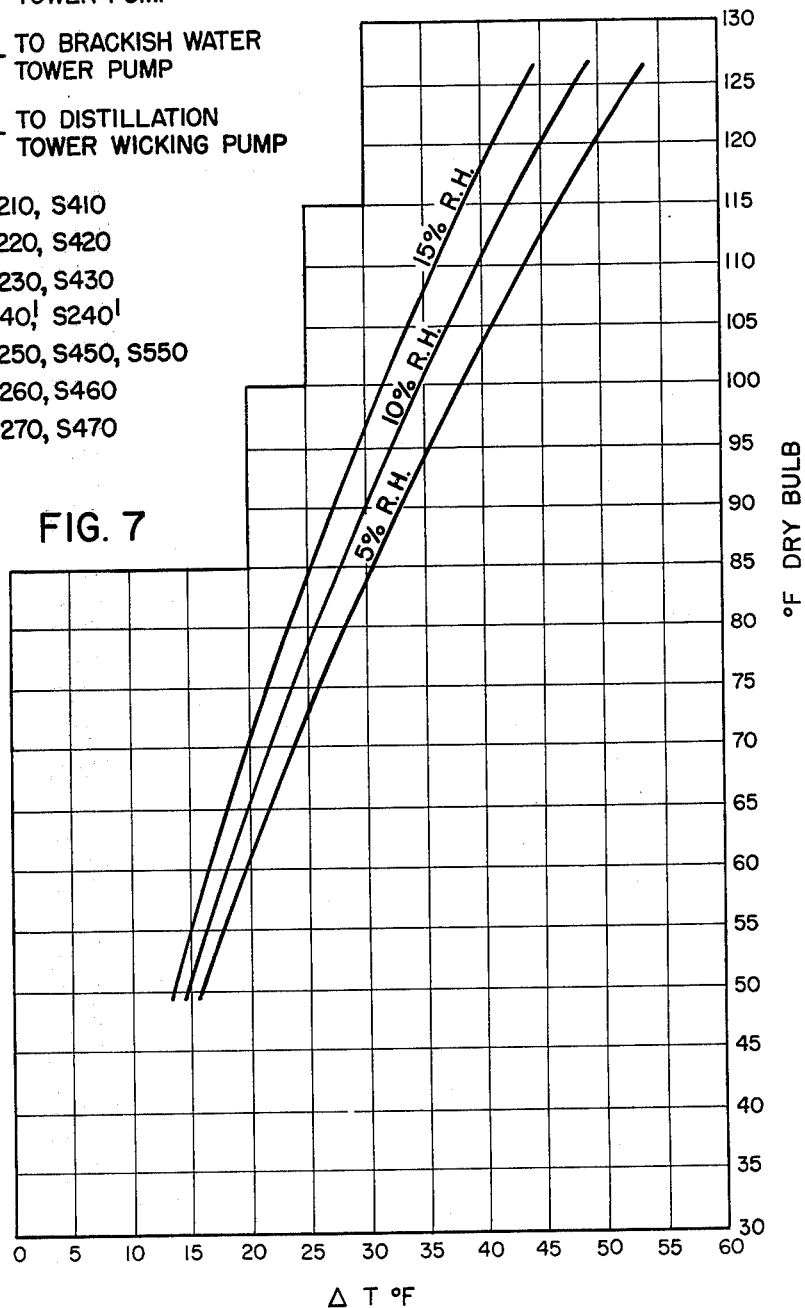
FIG. 7 shows a graph of dry bulb temperature of the air for various relative humidity of the air and the resultant $\Delta T$ corresponding to the different percent relative humidities at different dry bulb temperatures.

Referring now to FIG. 1; there is illustrated an apparatus 10 for removing salts and foreign matter from liquids, and more importantly, for making potable water from brackish water which may contain living matter which may endanger the long range health of crops and animals alike. The distillation system of the present system 10 is adapted to utilize the earth's gravitational field and psychrometrics as defined in the ASHRAE 1963 Psychrometrics Chart No. 1 at sea level (29.921 inches of mercury barometric pressure). FIG. 7 shows $\Delta T$ which one may obtain at various percent relative humidity plotted against the dry bulb temperature in °F. One should be aware that at different altitudes correction should be made, see Fifth Edition of Chemical Engineers' Handbook, section 20, page 7, equation:

$$H_a = H_o + 0.622 p_w [(1/P - p_w) - (1/760 - p_w)].$$

Referring to FIG. 1, the distillation system comprises two substantially vertical columns 30 and 50. Since at sea level the barometric pressure is 29.921 inches of mercury or 33.898 feet of water, one standard atmosphere will support 33.898 feet of water, if the water is at 4° C. At 4° C., water weighs 62.428 lb/ft3. See Handbook of Physical Calculations by Tuma, (McGraw-Hill) 1967—Mechanics of Fluids, page 113, (2) Measurements of Pressures, (a) Barometer, FIG. 5.02-5 for mercury.

To more fully understand the theory and function of the distillation system it should be noted that the height of each of columns 30 and 50 is in the order of 40 to 60 feet (for water) in a substantially vertical position. At the base of column 30 is a liquid seal 20 which also acts as a reservoir for the brackish liquid to be distilled. Liquid seal 80 acts as a liquid seal for column 50. Pipe means 21 supplies reservoir 20 with new feedstock and pipe means 89 provides fresh (distilled) potable water for humans, livestock and crops, etc.

Surrounding column 50 is a wettable substance 51 which also has embedded or impregnated therein one of the common salts such as sodium chloride (NaCl) or fuller's earth, special porous ceramic or any other substance which will absorb and act as a water wicking agent. Column 30 may be painted black and may also have attached finning material 31 to absorb heat radiation from the sun or ambient air. For low temperature geothermal heat, column 30 may be surrounded by a heat exchanger pipe (not shown) attached in such a manner as to add heat to the column 30.

At the top of columns 30 and 50 are ball check valves as best shown in FIG. 3, the ball check valve at the top of column 330 comprises a resilient ball 336 along with spring means 337 and spring retainer 338 for biasing said ball check valve closed in a tight sealing arrangement to an opening in the top of vertical column 30. A similar ball check valve 53 is found at the top of column 50. Note that in FIG. 1 a vapor bridge conduit 40, 40' has a caged ball check valve 41 along with guide cage 42 to seal against seat 45. Columns 30 and 50 are in the order of 40 to 60 feet as earlier stated and the height is important, since at sea level a perfect vacuum can only support approximately 33.898 feet of water.

The generally low temperature distillation system of this invention uses simple readily available pipes, tanks and water pump means that are obtainable, even in underdeveloped nations. This invention provides an efficient reliable low temperature, low external energy input to power pumps and control means to operate this novel purification plant.

In operation, containers 20 and 80 are primed to start the distillation plant. First fresh water in container 80 goes through pipe 82 to pump 84 through pipe 86 to vertical column 50 until the fresh water reaches the vapor crossover conduit 40. The resilient hollow float ball 41 will rise upward through ball cage 42 and will come to rest and seal in ball seal neck 45. The fresh water is sealed off from vertical column 30 and pump pressure will force noncondensables (gases) through vent ball check valve as best shown as vent valve 356 in FIG. 3, corresponding to vent tube 53 at the top of vertical column 50.

After a predetermined time, noncondensable (gases) and fresh water is vented from the top of the vent pipe 53 in which water will be caught in a circumferentially upwardly extended trough 54 by deflection shield means 55. Trough 54 has predetermined series of small holes whose outer radius is just greater than the radius of vertical column 50. After vertical column 50 is full of water (liquid) and all noncondensables have been vented to the atmosphere the second pump means 24 is started taking brackish water from container and liquid seal means 20 through pipe 22 through pump 24 and filling vertical column 30 through pipe 26 from pump means 24.

It is important to note that although vertical columns 30 and 50 are substantially the same height the pressure from pump means 84 is greater than pump means 24 so that when the water from liquid seal and storage tank 20 is forced to the top of vertical column 30 the final pressure which pump means 24 can deliver is such that it cannot unseat ball check means 41 from ball check seal 45 and all noncondensables are vented through vent ball check means 33 and after a predetermined quantity of brackish water flows from the top of vent tube 33 the brackish water will fill reservoir 34 at the top of column 30 and the accumulated water in reservoir 34 will be communicated through pipe 60 to reservoir 54 on top of vertical column 50 where it will mix with fresh water and saturates wet wicking 51 whereby evaporation will approach the wet bulb for a mixture of fresh water and saline water wetted wicking 51.

To provide heat transfer of column 30 the vertical column may be painted black and may also have outwardly extending radial fins which during the daylight hours will act as a radiation collector and at the same time column 50 will approach the wet bulb temperature which will provide a substantial $\Delta T$ between vertical column 30 and vertical column 50.

The next novel step of the invention deals with turning off pumps, first pump 24 and then soon thereafter pump 84. Both pumps 24 and 84 are so constructed that once these pumps are turned off water freely flows through them bidirectional.

Now from the laws of gravity we have designed a new and novel distillation water plant which uses the relationship of earth's gravitational field on a given density of fluid (liquid) to obtain a very low absolute pressure (vacuum) below one atmosphere which will cause the liquid (water) to boil and vaporize said vapor which will be transferred through crossover conduit means 40' and 40 from vertical column 30 to vertical column 50 where it will be condensed into distilled liquid (water), yet using only the dry bulb plus sun radiation on vertical column 30 and the wet bulb depression in vertical column 50 which will provide a $\Delta T$ the same as or exceeding the $\Delta T$ shown in FIG. 7 depending whether it is daytime (sun radiation) or night.

It is recognized that the rate of distillation will most probably be greater for the sunlight hours than for the night hours.

Another important aspect of this new and novel invention is that at predetermined times the two pumps, first pump 84 then pump 24 will cycle and repeat the removal of certain vapors and the new supply of the feedstock along with the predetermined purging of the dead—once living organisms and accumulated salts and solids through drain valve V30 which may be electrically activated or in the new developing countries be hand operated as can the pumps 84 and 24 be hand operated or power operated including such basic power sources as an animal walking a circular path. Fresh distilled water will exit through pipe 89 for storage and use. The overflow of water on wicking 51 will accumulate in catch basin 70 and be returned to container 20 through pipe 71.

FIG. 2 shows yet another embodiment 210 of the present invention. The embodiment of FIG. 2 combines vent purge means in a single vent means at the top of vertical column 230. Added is an optional descaling float means 290 with descaling brush means 292. The sequence of operation is essentially the same as described in FIG. 1. Fresh water as in storage container 280 which also acts as a liquid seal means for vertical column or pipe means 250.

Distillation is activated when pump means 284 brings potable water from container 280 through pipe 282 and is pumped through pipe 286 to vertical column 250 where the water rises up column 250 and noncondensables are forced through vapor crossover means 240 and 240' where the potable water activates the resilient ball float means 241 shown in an open position by gravity. Ball float means will rise and seal as shown 241' in an upwardly position.

Pump 284 continues to maintain liquid pressure against the underside of ball float seal means 241' and seals the potable water in vertical column 250 and crossover 240 from mixing with salt water 240' when pump means 224 is later activated. When pump means 284 reaches a predetermined pressure as may be sensed by sensor S210, pump means 224 is activated which brings brackish water from container 220 and liquid is communicated through pipe 222 to pump means 224 where it is supplied to the base of vertical column 230 through pipe 226.

Float brush means is optional depending on whether the inside of vertical column 230 is coated with a proper release agent such as Teflon which in most instances prevent scaling of the inside 294 of vertical column 230 and vapor crossover means 240'. If proper release coating is not used then pipe scrubber float means 290 with sufficient outwardly extending brush means 292 will rise along with the brackish water on each cycle and scrub the inside walls 294 sufficiently to prevent scaling of salt and other particles from clinging to the inside walls of column 230.

Brackish water will be pumped to the top of vertical column 230 and all noncondensables will be vented through resilient ball means 236 which is biased downwardly by spring means 237 pressing against ball check guide means 238 or gravity and the brackish water totally fills 240' as did the fresh water on the 240 side of vapor crossover means 240' and 240. It may be necessary to always coat vapor crossover means 240' of FIG. 2 as well as 40' of FIG. 1, 340 of FIG. 3, 440' of FIG. 4 and 540' of FIG. 5 with a proper release coating to prevent build up of solid materials.

In the embodiments of both FIG. 1 and FIG. 2 all noncondensables are purged from the system and the fresh water pump 84 and 284 always when running are capable of a pressure great enough so that pump 224 and 24 cannot force resiliant float seal means 241 and 41 from their positive seal. Pivot lever arm 242 aligns float 241 for positive seal means when in an upwardly seal position, float seal means 241' comes to rest in seal relationship with seal 245 as shown in FIG. 2.

Pump 224 is first turned off at a predetermined time after sufficient salt water has vented through vent tube 233 to sufficiently supply reservoir 234 and 254. Reservoir 254 receives the brackish water through drain tube 260 to wet wicking 251.

Sequentially first pump means 224 is turned off and thereafter pump means 284 is turned off. Both pump 224 and 284, when deenergized have bidirectional flow characteristics through them. The earth's gravitational field forces both the brackish water in column 230 and the fresh water in column 250 to drop downwardly and form a vacuum of such an extent that distillation takes place much as is done in a molecular distillation system.

Again, vertical column 230 is coated black and may also have fins 231 attached to enhance heat transfer to vertical column 230. Vertical column 250 is fitted with a suitable wetting wicking 251 so that the surface temperature of vertical column 250 is cooled and approaches the wet bulb temperature so that as shown in FIG. 7 sufficient $\Delta T$ is present to maintain rapid distillation of the brackish water.

The sudden reduction in pressure from slightly above one atmosphere to a very deep vacuum will explode moisture bearing living cells thus destroying the cellular structure and hopefully their DNA system.

This is of great importance to the unique portion of this invention since it is recognized that some, very small percent, of otherwise living organisms may fall through vapor crossover means 240' to 240 and 40' to 40 thus contaminating the fresh distilled water.

It should be obvious to those skilled in the art that another important part of this invention also gives added safety from contamination of the fresh distilled water in that the normal salt content of an aquatic living organism has cellular destruction when placed in distilled water and this becomes even more destructive to the cell tissue when going rapidly from one atmosphere to greater than one atmosphere and then quickly to a rather deep subbaric pressure thus particles of dead organisms rendered virtually back to molecular matter is a part of this unique invention. Flushing of tanks 20, 220, 280 and 420 can be done by opening valve V30 of FIG. 1 and valves V230 and V210 of FIG. 2, also valve V430 of FIG. 4.

FIG. 3 shows essentially a mirror image of the vapor crossover means shown in FIG. 1. The object of the reversal of the liquid and vapor seal means ball float 41 and ball float seal means 341 is that since the distillation system runs at such a low absolute pressure if there were no noncondensables being released from the brackish water (liquid) or other liquids other than water then there would be no need to pump liquid up column 50 or 250 as shown now in FIG. 3 as 350. Moreover if there are slight numbers of vapor molecules of noncondensables, these molecules (gas) will be trapped in the upper sections of vertical column 330 (noncondensable trap means) thus when it is necessary to purge column 330 of noncondensable gases or descale and recharge column 330 only one pump need be used.

Experience may show that only one out of many cycles would pump means for column 350 be needed to purge noncondensables from atop column 350. This is very important when pump means is provided by animalpower or by manpower in underdeveloped countries or newly developing countries. Also this scheme conserves external shaft or electrical energy input. The only disadvantage in the reversal of the vapor crossover means is that as vertical column 330 is filled to the top with brackish water without actually mechanically lifting ball float seal means 341 before the brackish water reaches the ball flange seal means there could be slight spillover of brackish water into the distilled side 340' or vertical column 350.

However it should be noted that the same destruction of living cells will occur and the only bad results would be possible slight minute quantities of salt or foreign matter might get into the distilled side of the distillation system.

The distillation system will probably be free running for long periods of time and water will have to be pumped by an external pump not shown to keep the evaporation rate up on the exterior of vertical column 350 wicking 351 for proper wet bulb depression when used.

Figure 4:
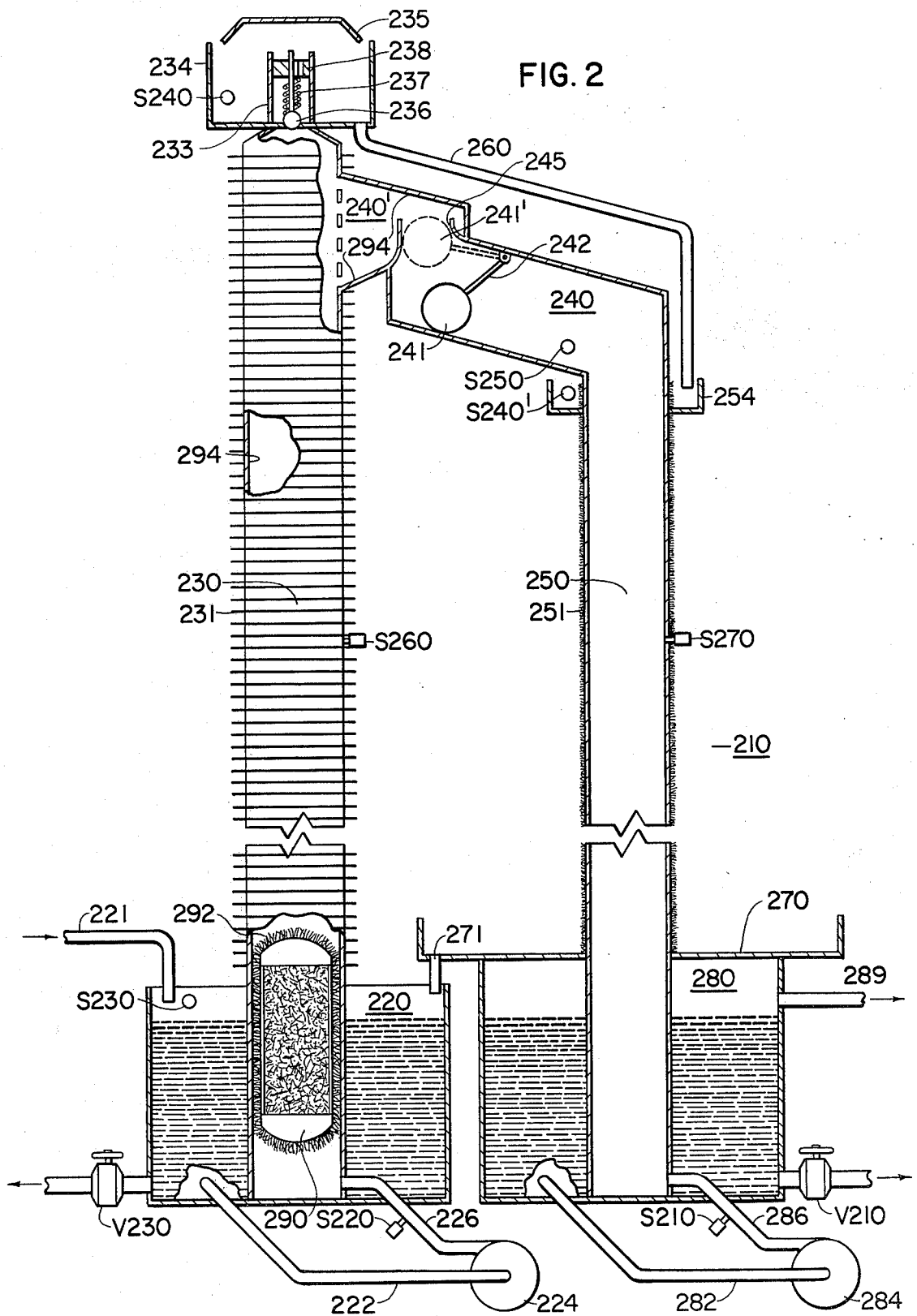
FIG. 4 illustrates yet another modification of FIGS. 1, 2 and 3.

FIG. 4 operates much as FIG. 2 with the exception that heat for vertical column 430 can be supplied externally to brackish water leaving pump means 424 through conduit means 426. Low temperature heat being supplied to brackish water leaving pump means 424 through liquid conduit 426 could be low temperature geothermal heat from 80° F. to 160° F. or thereabouts, also similar heat can be supplied by solar collectors, solar ponds (manmade or natural), waste heat from industrial plants, etc.

It is understood that conduits 430, 450, 426' and 486' are insulated, not shown.

Brackish water coming from reservoir 420 through conduit means 422 to pump means 424, exiting through conduit 426 to brackish water heater (heat exchanger), not shown, heated brackish water coming from brackish water heater through liquid water conduit 426', being sprayed downwardly as shown in FIG. 4 below opening of vapor crossover means 440' attached to vertical column 430, said vapor passing through vapor crossover means 440', 440 to be condensed in vertical column 450.

Independently distilled water in container 480 passes through conduit 482 through pump means 484 exiting through liquid carrying conduit 486 passing through cooling means, not shown, and said cooled distilled liquid passing through conduit 486' where it is sprayed downwardly below vapor crossover conduit means 440 in vertical column 450 to condense distilled vapors passing through vapor crossover means 440' and 440.

Sensor means S420 and Sensor means S410 are in pressure sensor relationship to liquid in conduit means 426' and 486' as shown in FIG. 4. Sensor S450 located atop column 430 senses when it is necessary to purge noncondensables from the desalinization system. First V450 is closed which fills vertical column 450 and closes ball check seal means 441 against ball seal means 445. All noncondensables present in verticl column 450 are exhausted through vapor crossover section 440 through vapor crossover valve seal means 445 into vapor crossover section 440' and vertical column 430.

Floatable crossover liquid valve seal means 441 will rise and seal against valve seal seat 445. Liquid pressure will increase in vertical column 450 and will be sensed by sensor S410. When pressure within conduit 486' reaches a predetermined setting causing valve V440 to close filling vertical column 430 with brackish water.

Floatable descaling means 490 with cleansing means 492 will rise along with the brackish water and cleanse the interior of vertical column 430.

The filling of vertical column 430 with brackish water will vent to the atmosphere all noncondensables through vent purge valve 436.

Sensor S440 located atop vertical column 430 will sense water level in water containment trough 434 and open valve V440 to allow brackish water in column 430 to drop by gravity below vapor crossover conduit 440' and water spray means located at the end of liquid conduit 426' within vertical column 430. Once valve V440 has allowed the brackish water in vertical column 430 to get below vapor crossover opening 440'; valve V450 will be opened and the distilled water in vertical column 450 will fall by gravity opening vapor crossover valve seal means 441.

The system is now restored to normal operation.

R410 is located in vapor crossover chamber 440' and is optional depending on the contamination of the brackish water. For instance, (diseased water) contaminated discharged water from a sewage disposal plant or water from a bacteria contaminated lagoon might require radiation of a selected type to further assure potable water. R410 will be selectively used for such applications.

Figure 5:
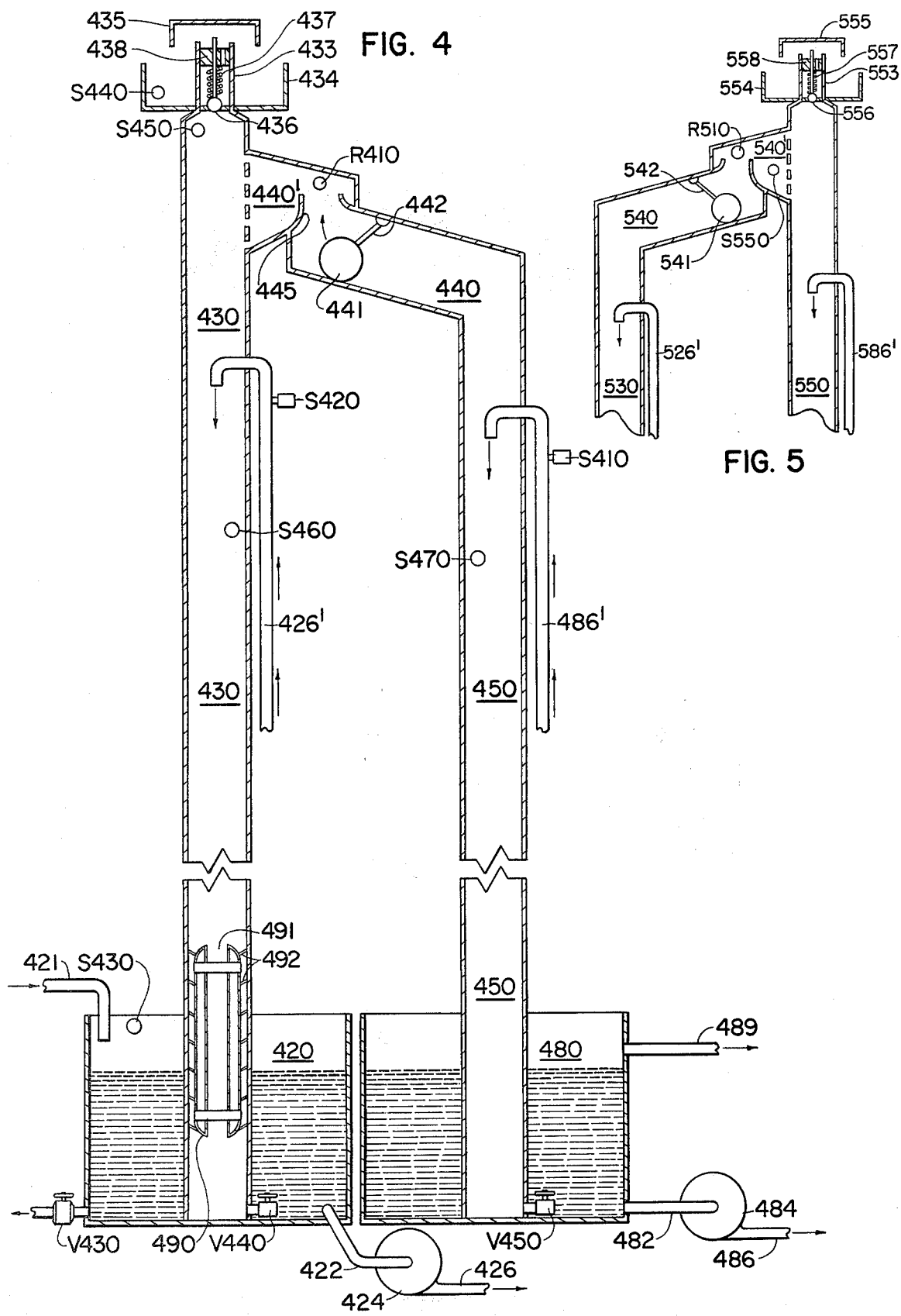
FIG. 5 also illustrates yet another modification of FIGS. 1, 2, 3 and 4.

FIG. 5 is a mirror image of FIG. 4 and operates essentially the same as FIG. 4 and FIG. 3 already described.

All like numbers are preceded by a 500 series, for instance R510 is the same as R410. Likewise 530 and 550 are the same as 430 and 450, etc.

Independent of the previously shown figures is yet another means for providing an adequate differential temperature between the first substantially vertical column and the second substantially vertical column. Said first vertical column being at an elevated temperature above said second vertical column.

Not shown, is a modification of the second column where an adequate ΔT is provided by selectively coating the second column with a material having near unity emissivity in the near infrared spectrum and yet possess high reflectivity in the visible spectrum. The first vertical column may have outwardly extended radial fins coated with a material with maximum absorption qualities whereas the second column which may have outwardly extending fins coated with near unity emissivity as previously described.

With the above described modification the invention has been simplified in terms of lower maintenance costs, however it is recognized that the purification plant may require more heat transfer columns (surface) than the previously described plant yet desirable as understood by those skilled in the art.

Figure 6:
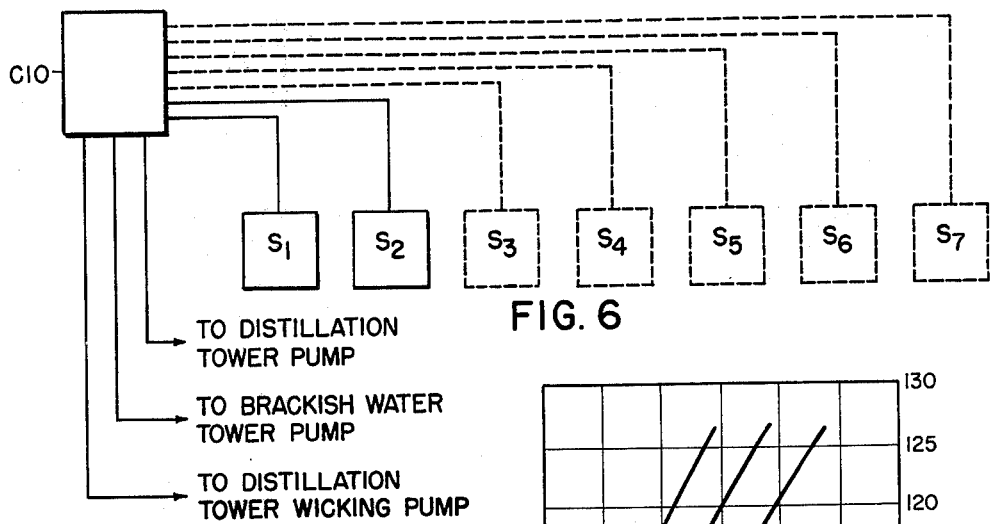
FIG. 6 illustrates a control circuit which might be used with the embodiment FIG. 1 or FIG. 2 or FIG. 3, FIG. 4 or FIG. 5.

FIG. 6 shows that for those countries which are classified as developing or developed countries a sophisticated controller C10 by means of appropriate sensors may be employed to substantially automatically operate this new and novel distillation system. Sensor S1 shown in FIG. 6 will give an output signal going to controller means C10 which can be a microprocessor or a simple set of reliable relays that function as follows: When the distillation system is in full operation, if output of sensors S7 and S6 indicate that for a predetermined vacuum S5 there is insufficient ΔT as indicated by the differential temperature sensed by S7 and S6 then an output from C10 to pump means, not shown, may add water directly to wicking 51, 251 or 351 which will provide an adequate ΔT for a given absolute pressure as predetermined by sensor S5.

Likewise sensor S3 predetermines whenever there is adequate water volume in storage tanks 20, 220 and 420 to properly operate the cycle.

Sensors S4 and S4' indicate if sufficient water has been purged to supply adequate water for wicking 51, 251 and 351, when used.

Sensors S1 and S2 provide the information to controller C10 when pumps 84 and 24, 284 and 224, 484 and 424 assures proper sequence so that columns 50, 250 and 450 are properly filled and properly vented before columns 30, 230 and 430 are filled and vented before repeating a new distillation cycle.

It is understood that controller C10 can activate flush valve V30 as well as flush valves V230, V210 and V430 for proper flushing containers 20, 220, 280 and 420.

One skilled in the art may also find other uses for controller C10 covering such things for remote areas as turning off and on wind charger to keep battery power at a safe and functional level and also start and stop wind power water lift pumps, data logging, etc.

FIG. 7 shows a plot of ΔT in degrees Fahrenheit vs. dry bulb temperatures in arid regions of the world for given relative humidities from ASHRAE Psychrometric Charts 1 and 3 at sea level. It should be noted that from ASHRAE Psychrometric Chart #4 for 5,000 feet and ASHRAE Psychrometric Chart #5 for 7,500 feet there is a marked shift to the right in FIG. 7 which increases the ΔT for a given dry bulb and percent relative humidity for instance at 120° F. dry bulb at sea level and 15% relative humidity the ΔT is 42.5° F. For the same dry bulb and 15% relative humidity the ΔT increases from 42.5° F. at sea level to 46° F. at 7,500 feet. This amounts to approximately 8.5% increase in the ΔT available for distillation.

For instance Salt Lake City, Utah is 4,220 feet above sea level, Amarillo, Tex. is 3,607 feet above sea level, Addis Ababa and Asmara, Ethiopia are both at about 7,700 feet above sea level, Jerusalem, Israel is 2,485 feet above sea level, most of Navada and Utah flatland run in the range of 4,500 feet to 7,000 feet with large quantities of brackish water below numerous dry lakes, also this is true of New Mexico and Arizona.

At substantially sea level from Brownsville to Corpus Christi, Tex. and along the Gulf Coast of Mexico from Tampico to Matamoros, the large U.S. Padre Island National Park, Matagorda Island and Galveston Island do not have large quantities of fresh water and on some of these islands no potable water at all exists such as Baja Peninsula of Mexico which are excellent candidates for my new and novel invention. Wind power however is available in great quantity for powering my new and novel distillation system in these areas.

For the extremely underdeveloped countries it should be obvious to those skilled in the art that my invention can be adapted for use in the outlying areas such as India, Egypt, Turkey, etc. The simple modification can best be shown in FIG. 1 where the device could be manufactured with the following modifications: Pump means 24 and 84 would be replaced by two simple hand operated valves submerged and attached near the bottom of vertical columns 30 and 50 but opening directly into their fluid containment means. Valve closure shaft means would extend upwardly to above or near the top of fluid containment means 20 and 80 for opening and closure of said hand valve means. It is important that the valve packing or shaft seal means be below the fluid surface in both fluid containment means 20 and 80 so that any slight leak when the plant is in operation will maintain the necessary barametric seal between the fluid containment means and the submerged valve attached at the base of the vertical columns. Since for some fluids (water) the purification plant's vertical columns will be operating at subbaric pressures.

Purge means 33 and 53 would be replaced by removable resealable cap means for priming and putting the purification plant into operation.

Sequence of operation for starting the new and novel purification plant in these regions would be as follows: First both hand operated valves at the bottom of containment means 20 and 80 would be closed. Containment means 80 will be filled with the purified fluid, containment means 20 will be filled with the unpurified fluid. Caps from vertical columns 30 and 50 are removed and first, vertical column 50 shall be filled to the top removing all noncondensables from vertical column 50 and then resealing column 50. Second, vertical column 30 is filled to the top with the unpurified fluid and sealed. Sequentially opening first valve submerged in the unpurified containment means 20 and soon thereafter opening second valve submerged in the purified containment means 80.

The purification plant is now ready for operation using any of the foregoing means for providing suitable means for providing a predetermined differential temperature ($\Delta T$) between the first and second columns.

There has been provided by the present invention an improved system for providing potable water to the world of which some few areas have been given as examples. Water is essential to mankind the world over. With the need for low input of depletable energy such as fossil fuel, the world's natural arid lands to desert regions and resultant unusable water for growing food for animals and the scarcity of potable water for animals and mankind, makes this new and novel invention beneficial to all of mankind. The potential for the applicant's distillation system is very broad in terms of distillation of liquids, which could be water, from near primitive cultures to modern cultures where the need for conservation of fossil fuels and nuclear fuels are of extreme importance in the world.

In the old countries the need of water is paramount to the future of the young, healthy generations now growing up and generations to come.

As shown the basic distillation structure can be used in many ways from man powered to animal powered to modern day technology to power the distillation system.

It should be recognized that one Btu of heat is equivalent to 778 ft.-lb. of work. Yet nature provides in arid regions of the world an average of 1.35 kilowatts of power per square meter insulation (sun radiation).

It should be noted that the rate of distillation will depend on the heat transfer surface and also there is no need for large horsepower motors as these are only related to time of filling the distillation towers. It should also be noted that it takes the same work to fill the distillation towers whether one should use shut off valves in place of the pumps shown and the water for the fresh water tower and the brackish water tower are piped externally up the side of the vertical columns or hand carried to fill the towers (columns) from the top and then sealed after filling to start the distillation process.

Also it is recognized that as water is vaporized from the brackish water tower and condensed in the fresh water tower there will be new brackish water feed automatically by the laws of nature as the fresh water is drained from the fresh water reservoir thus following the well known laws of fluids as the same atmospheric pressure acts on both liquid seal means—liquid reservoirs that is to say that the liquid height in both columns will tend to remain at the same height depending on the absolute pressure in the now common two columns through vapor crossover means 40, 40′, 240, 240′, 340, 340′, 440, 440′ and 540, 540′ as illustrated by Tuma, Mechanics of Fluids, page 113, FIG. 502-3 and 502-5 and FIG. 502-1 and FIG. 502-2.

Also it should be recognized that if sufficient $\Delta T$ between the brackish water tower and the distilled water tower can be maintained without the need for depending on the wet bulb depression as described in FIG. 7 then there is no need for an external wet wicking of vertical column 50, 250 or 350 and these column's surface may be painted with suitable spectral emissivity material and could be shaded during the sunlight hours and may also be fitted with finning to help the heat transfer for condensation to liquid in these vertical columns.

To those skilled in the art it will be obvious that the first column may require (not shown) an atmospheric sequentially controlled inlet valve to be opened when flushing and recharging of first column's media is required from time to time.

It should also be obvious to those skilled in the art that pump means at the base of the first and second columns while shown in a forward unidirectional can be so constructed to be bidirectional when selectively energized depending whether first or second columns are to be filled or emptied.

It is understood by those skilled in the art that the term fluid or water can be interchanged with other evaporable fluids such as methanol ($CH_3OH$) and ethanol ($C_2H_5OH$) where density and vapor pressure are applicable to this new and novel invention.

While there has been disclosed presently preferred embodiments of the invention, it is understood that the invention is not limited to these Figures shown but rather the invention will encompass all engineered structures embodied within the scope of the following claims:

I claim:

1. A barometric distillation system comprising:
   a first column of predetermined barometric height including energy imput means;
   a second column of predetermined barometric height including energy rejection means;
   means to intermittently vent said first and second columns including;
   at least one means to vent at the highest point of said system;
   means to pump an impure liquid into said first column;
   means to pump purified liquid into said second column, and;
   means communicating with said first and second columns permitting complete filling of said second column with said purified liquid, while preventing flow of said impure liquid into said second column when said first column is completely filled with said impure liquid.

2. A system as in claim 1 where first vertical column is coated with selective material to absorb ambient heat.

3. A system as in claim 1 where first vertical column is fitted with fins for absorbing ambient heat.

4. A system as in claim 1 where first vertical column of water to be purified to be preheated.

5. A system as in claim 1 where first vertical column of water to be purified, liquid seal means at base of first vertical column and container for water to be purified is coated with selective material to absorb radiant heat.

6. A system as in claim 1 where second vertical column is selectively coated with a material for radiating heat away from said second column.

7. A system as in claim 1 where second vertical column outer exterior is fitted with external fins for radiating heat away from said second column.

8. A system as in claim 7 where outer exterior is selectively coated with a material for radiating heat away from said second column.

9. A system as in claim 1 where second vertical column outer exterior is fitted with a wicking wetting material.

10. A system as in claim 1 where outer exterior of second column is surrounded by salt film, fuller's earth or a porous ceramic material so made as to hold or absorb or be wetted by water.

11. A system as in claim 1 where vapor communicating means has a mechanical actuated seal means between first and second vertical columns.

12. A system as in claim 1 where vapor communicating means has an electrical (piezoelectric) actuated seal means between first and second vertical columns.

13. A system as in claim 1 where vapor communicating means from first vertical column to said second vertical column has a ball float seal means between first and second vertical columns.

14. A system as in claim 1 where vapor communicating means has an electro-mechanical actuated seal means between first and second vertical columns.

15. A system as in claim 1 where vapor communicating means has a hand actuated or hand operated seal means between first and second vertical elongated columns.

16. A system as in claim 1 where the interior of vapor communicating means between first and second vertical columns is coated with a release agent (antistick) such as tetrafluoroethylene (Teflon) to prevent solid materials from building up or clinging to the inner surface of vapor communicating means between first and second columns.

17. A system as in claim 1 where coating inside vapor communication means between first and second columns may be another coating material other than tetrafluoroethylene to prevent solid materials from building up or clinging to the inner surfaces of vapor communicating means between first and second vertical elongated columns.

18. A system as in claim 1 where the interior of the first vertical column is coated with a release agent such as tetrafluoroethylene to prevent solid materials from building up on inner surface of the first vertical column.

19. A system as in claim 1 where coating inside the first column may be another coating material other than tetrafluoroethylene to prevent solid materials from building up or clinging to the inner surfaces of the first vertical elongated column.

20. A system as in claim 1 where a float scrubber means with outwardly extending bristles or scrappers prevent solid materials from building up or clinging to the inner surface of the first vertical elongated column to purify brackish water or other fluid to be purified, float cleaning means being so constructed so that it does not substantially impair passage of vapors ascending upwardly in first column.

21. A system as in claim 1 where catch reservoirs mounted atop first and second vertical columns communicate the evaporable liquid vented to be communicated to the wicking or wetted agent of the second vertical elongated column.

22. A system as in claim 1 where catch reservoirs mounted atop first and second vertical columns are coated on the reservoir side with a anticlinging or antisticking agent to prevent build up of solids.

23. A system as in claim 1 where heat is supplied to the first elongated vertical column by direct radiation.

24. A system as in claim 1 where heat is transferred to first vertical column by a heated fluid in heat transfer relationship to the first elongated vertical column.

25. A system as in claim 1 where a heated fluid is circulated through pipes attached to the exterior of the first vertical elongated column.

26. A system as in claim 1 where a heated fluid being circulated is passed through one or more circumferentially spirally wound pipes attached to the exterior of the first vertically elongated column.

27. A system as in claim 1 where a heated fluid being circulated is passed through one or more vertically surpentined pipes attached to the exterior of the first vertically elongated column.

28. A system as in claim 1 where at the bottom of the second vertically extending elongated column has a catch basin for disposing of surplus evaporable liquid not totally evaporated by the wetted wicking material on the exterior of the second vertical elongated column.

29. A system as in claim 1 where liquid seal means and brackish water supply reservoir at the base of the first vertical elongated column has a brackish water supply means.

30. A system as in claim 1 where in both seal means at the base of first and second vertical columns have flush means at the base of liquid seal means for cleaning.

31. A system as in claim 1 where pump means are electrically powered.

32. A system as in claim 1 where pumps are powered other than by electricity.

33. A system as in claim 1 where pumps means are replaced by hand valves and water is communicated to the top of both vertically extending columns and all noncondensables are purged by filling to the top of both vertically elongated columns and properly capped before sequentially opening hand valves at the base of the two vertically extending columns.

34. A system as in claim 1 where the first vertical elongated column is facing substantially to the source of external radiation.

35. A system as in claim 1 where the second vertical column has sun shading which allows the wind to circulate freely for good heat exchange.

36. A system as in claim 1 where ball float seal means in vapor communication means between the first vertical elongated column and the second vertical elongated column is free floating and is caged in an up and down movement.

37. A system as in claim 1 where ball float seal means in vapor communication means between the first substantially vertical elongated column and the second substantially vertical elongated column is guided to its seal means by a pivotal arm from full open position to full seal position.

38. A system as in claim 1 where vapor-liquid seal means in vapor communication means between first and second substantially vertical elongated columns uses a rotational petcock.

39. A system as in claim 1 where vapor-liquid seal means in vapor communication means between first and second substantially vertical columns is located on the second vertical column division side of seal means.

40. A system as in claim 1 where vapor-liquid seal means in vapor communication means between first and second substantially vertical columns is located on the first vertical column division side of seal means.

41. A system as in claim 40 where the cock vapor-liquid seal means in the vapor communication means is located on the first vertical column division side of the vapor communication means and after venting all noncondensables from both vertical columns only the pump means or water filling means on the first vertical brackish water column need be cycled for replenishing the brackish water or clensing of the first vertical column of solids for a predetermined time, or until noncondensables trapped in second vertical column side requires complete venting to the atmosphere.

42. A system as in claim 1 where two or more water purification systems may be cascaded.

43. A system as in claim 1 where two or more vertical columns are paralleled with the first or second vertical column or both first and second vertical columns.

44. A system as in claim 1 where the media to be purified is another evaporable liquid other than water.

45. A system as in claim 44 where the temperature range of the vapor pressure curve for the media to be purified lies in the range between 33° F. and 200° F.

46. A system as in claim 44 where the media to be purified is methanol ($CH_3OH$) or ethanol ($C_2H_5OH$) from a (beer) fermented feedstock.

47. A system as in claim 1 where the temperature range of the vapor pressure curve for the media to be purified lies in the inhabitable temperature range of man on the planet earth.

48. A system as in claim 1 where the media to be purified is water and the pressure range of the vapor pressure curve lies between 0.09234 and 11.526 pounds per square inch absolute.

49. A system as in claim 1 where the two substantially vertical column heights immediately below the vapor communication means between the two columns is such that the earth's gravitational field is in the altitude range where man lives on the planet earth and can cause a pressure above the liquid to be purified in the first column or columns and the purified liquid in second column or columns to be in the range of 0.09234 pounds per square inch absolute and 5.926 pounds per square inch absolute when the pressure on the barometric seal means is in the normal barometric pressure range for the altitude which man normally lives on the planet earth when the two substantially vertical columns have at the base a liquid barometric type seal means.

50. A system as in claim 1 where the two or more vertical columns whose height just below the vapor communication means and the top surface of the water liquid seal means at the base of the first one or more vertical columns of water to be purified and the second one or more vertical columns of purified water whose maximum height is only set by the economic cost and the vertical structure or maximum height set by local codes or regional climatic conditions.

51. A system as in claim 1 where pressure sensor means with predetermined pressure settings are located to sense the pressure in the first vertical column of water to be purified and sense the pressure in the second vertical column of purified water and when all noncondensables have been vented to the atmosphere, sensor means sequentially turns off pump means to allow first water to be purified in first vertical column to fall by gravity and second purified water in second column to fall by gravity thus preventing mixing of purified water with brackish water.

52. A system as in claim 1 where sensor is added to determine proper liquid level of the liquid seal means at the base of each vertical column and sensor means attached to the outer surface of both vertical elongated columns to determine if proper $\Delta T$ is being maintained between the two vertical column means to maintain proper $\Delta T$ by activating sequentially valve or pump means.

53. A system as in claim 1 where sensors are located on one or both vertical columns to determine if sufficient water has been purged atop both vertical columns to provide sufficient water to keep wetted wicking properly wetted to provide a predetermined $\Delta T$ for a predetermined time.

54. A system as in claim 1 where the output of temperature sensors located on the exterior surface of the first vertical elongated column and the second vertical elongated column differential temperature is in the predetermined range for the output of the absolute pressure sensor located in the vapor communication means for proper distillation, said sensors being preprogramed to activate pump or valve means to maintain proper distillation.

55. A system as in claim 1 for making potable water from water containing aquatic living organisms.

56. A system as in claim 55 where the aquatic living organisms are first subjected to a pressure above the aquatic pressure in which they have been living for a predetermined time and then in a short predetermined time are subjected to an absolute pressure from 0.09234 pounds per square inch absolute to 3.718 pounds per square inch absolute and a temperature from 33° F. to 175° F. when they are substantially at the top surface of the first substantially vertical column.

57. A system as in claim 1 for making potable water from water containing harmful aquatic living organisms living within the temperature range of 33° F. to 175° F.

58. A system as in claim 1 where vapors passing from said first column to said second column are bombarded by germicidal purification means in the order of 2600 angstrom wavelength by use of mercury vapour lamps, xenon, hydrogen arc or other lamps capable of giving off light wavelength lethal and toxic to cells of living organisms which may be present in the vapors being transferred from the first vertical column to the second vertical column.

59. A system as in claim 1 where vapors passing from said first column to second column are bombarded by microwave radiation in the range of 6 to 10 megahertz which is commonly used in coagulation of tissue in brain surgery of of such a watt per centimeter squared level as to cause total destruction of any microorganisms which might be caught in the moving vapors.

60. A system as in claim 1 where eradication of living organisms that may be caught in the moving vapors from the first vertical column to the second vertical column are selectively subjected to a radioactive substance of such a magnitude and duration to kill said living organisms, said radiation may be X-rays, Beta rays, Gamma rays, Alpha beta gamma rays or any combination thereof which could be provided by various radioactive materials.

61. A purification system as in claim 1 where the fluid to be purified is forced through conduit means and exit downwardly in first vertical column to enhance vaporization of said fluid.

62. A purification system as in claim 1 where the fluid to be purified is forced through conduit means, where heat is added and exits downwardly in first vertical column to enhance vaporization of said fluid.

63. A purification system as in claim 1 where the purified fluid is forced through conduit means and exits downwardly in second vertical column to enhance condensation of vapors in said second vertical column.

64. A purification system as in claim 1 where the purified fluid is forced through conduit means where heat is extracted and exits downwardly in second vertical column to enhance condensation of vapors in said second vertical column.

65. A system as in claim 1 where pump means are selectively bidirectional to facilitate purging of media in first and or second columns.

66. A system as in claim 1 with valve means located at or above liquid in said column or columns which when opened at a predetermined time to allow atmospheric air to enter said columns to facilitate purging of media in said first column.

* * * * *